June 11, 1963  W. KLENK  3,093,233
DEVICE FOR FEEDING UNITS OF MATERIAL TO
CONTINUOUSLY MOVING CARRIERS
Filed Aug. 8, 1961
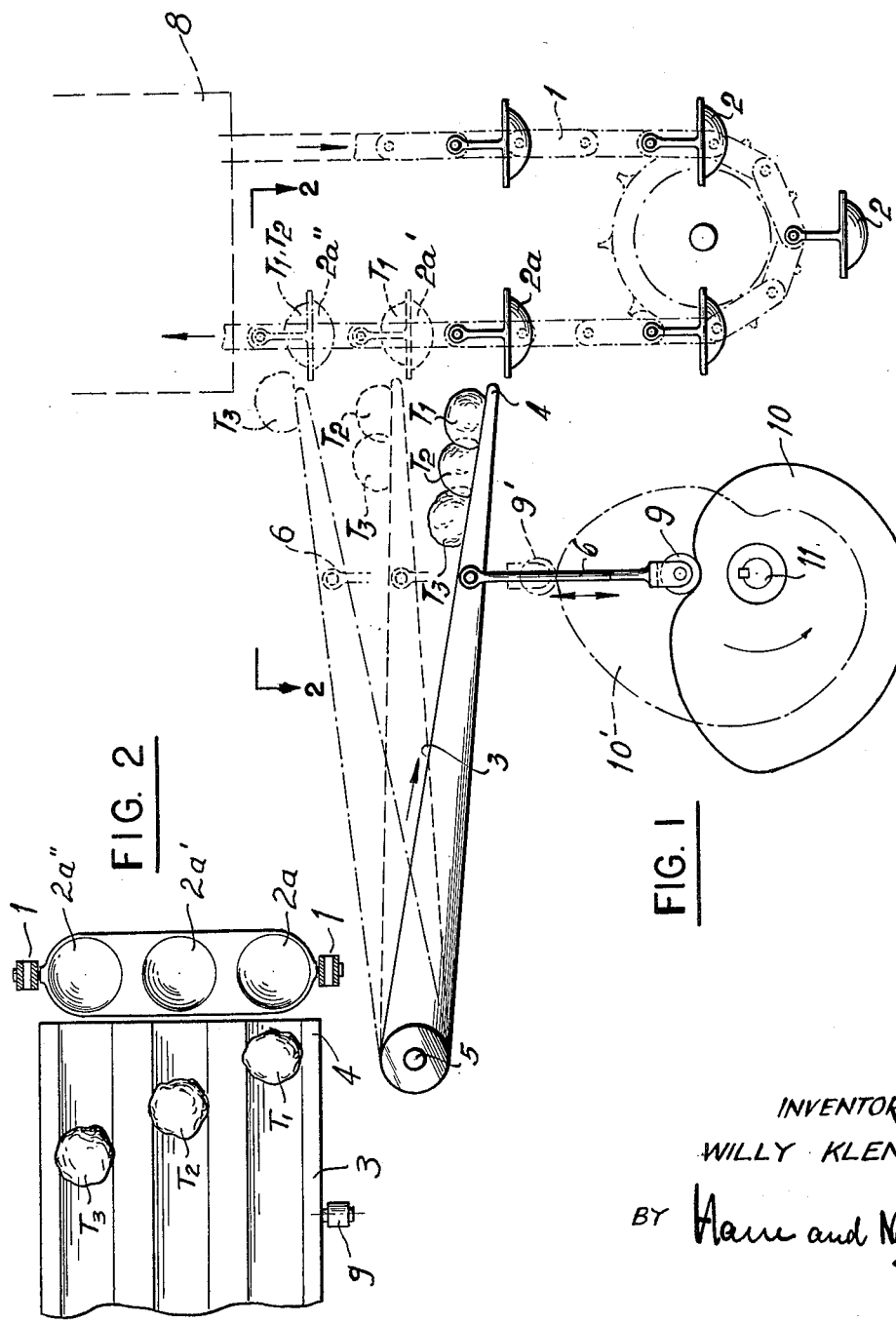
INVENTOR
WILLY KLENK
BY Hauu and Nydick
ATTORNEYS

United States Patent Office 3,093,233
Patented June 11, 1963

3,093,233
DEVICE FOR FEEDING UNITS OF MATERIAL TO CONTINUOUSLY MOVING CARRIERS
Willy Klenk, Korntal, near Stuttgart, Germany, assignor, by mesne assignments, to Werner & Pfleiderer G.m.b.H., Zug, Switzerland, a firm of Switzerland
Filed Aug. 8, 1961, Ser. No. 130,111
Claims priority, application Germany Aug. 11, 1960
7 Claims. (Cl. 198—20)

This invention relates to a device for successively feeding pieces of dough to continuously moving dough carriers of a proofing or fermentation cabinet, as used in the baked goods industry.

There are known proofing cabinets with dough carriers continuously moving at constant speed and also proofing cabinets in which the dough carriers move step by step, each step being initiated by a piece of dough entering the cabinet. Cabinets with continuously moving dough carriers offer the advantage that the time of passage through the cabinet is constant for each dough carrier, and hence for each piece of dough also. However, cabinets of that type have the disadvantage that a correct and uniform loading of the dough carriers requires that the pieces of dough arrive at the dough carriers of the cabinet very accurately located on the conveyor, usually a band conveyor, upon which they are placed to be transported to the carriers. More specifically, the pieces of dough must be uniformly spaced lengthwise on the feed conveyor, and when the pieces of dough are placed in several parallel rows on the conveyor, as is frequently the case, the pieces of dough in the several rows must be in accurate transverse alignment. In practice, it is impossible, or at least very difficult, to maintain such exacting conditions of location. The pieces of dough are fed onto the conveyor from a dough-working machine at a preceding station—for instance, a dough-kneading machine—which often does not discharge the pieces of dough quite uniformly and the pieces of dough may also be displaced somewhat while on the conveyor, due to the movement thereof, whereby the location of the pieces of dough may be quite irregular on the conveyor. The result is that the dough carriers of the proofing cabinet are not uniformly charged, and the charging of a dough carrier with two pieces of dough, leaving one carrier empty, occurs occasionally.

It is a broad object of the present invention to provide a novel and improved device for feeding pieces of dough to a proofing cabinet with continuously moving dough carriers, which assures a correct loading of the dough carriers, even though the pieces of dough may be malpositioned on the feed conveyor when arriving at the dough carriers.

It is a broad object of the present invention to provide a novel and improved device for feeding pieces of dough to a proofing cabinet with continuously moving dough carriers, which assures a correct loading of the dough carriers, even though the pieces of dough may be malpositioned on the feed conveyor when arriving at the dough carriers.

A more specific object of the invention is to provide a novel and improved device of the general kind above referred to which automatically compensates for pieces of dough malpositioned on the feed conveyor, so that all of the pieces of dough are fed to the respective carriers.

Another more specific object of the invention is to provide a novel and improved device of the general kind above referred to which allows a comparatively long period of time for the transfer of the pieces of dough from the conveyor to the dough carriers. This affords the advantage that a piece of dough which arrives late at the intended carrier, can still be transferred to that carrier, thereby effecting a uniform and correct loading of all the carriers.

While the device of the invention is primarily useful for the transport and feeding of pieces of dough to proofing cabinets of the kind above referred to, it is also useful for the transport and feeding of units of other materials under similar conditions.

Other and further objects, features and advantages of the invention will be pointed out hereinafter and set forth in the appended claims constituting part of this application.

In the accompanying drawing, a preferred embodiment of the invention is shown by way of illustration, and not by way of limitation.

In the drawing:
FIG. 1 is an elevational diagrammatic side view of a feeding device according to the invention, and FIG. 2 is sectional plan view taken on line 2—2 of FIG. 1.

Referring now to the drawing in detail, the exemplified feeding device according to the invention comprises a proofing or fermentation cabinet 8. This cabinet should be visualized as being of conventional design, and only part of the outline thereof is indicated. Feeding of pieces of dough to the cabinet for fermentation therein and discharge of pieces of dough from the cabinet are effected by means of a continuously moving conveyor 1, shown as a chain conveyor travelling through two parallel straight paths. Each conveyor mounts a plurality of dough carriers 2 and 2a, only a few of which are shown. The carriers are arranged in transverse rows of three carriers. Of course, more or fewer carriers than three may be provided in each transverse row. The rows are uniformly spaced on the conveyor. The dough carriers are shown as rather shallow bowls or buckets pivotally mounted on links of the conveyor. As indicated in FIG. 1 by an arrow, the carriers move into the cabinet upwardly along a perpendicular rectilinear path, and out of the cabinet along a downwardly directed path, which may also be rectilinear. However, as is evident, the dough carriers may also travel in a horizontal plane along similar paths. The means for continuously driving the conveyor 1 is not shown; it should be visualized as being conventional, and does not constitute part of the invention.

Feeding of pieces of dough from a preceding dough-working machine to the dough carriers is effected by means of endless conveyor 3, shown as a band conveyor. Three pieces of dough T1, T2 and T3, of generally spherical configuration, are shown on conveyor 3. The three pieces may be visualized as being each part of three parallel rows on the conveyor. As previously pointed out, the respective pieces of dough in several parallel rows should be in correct transverse alignment. However, the three pieces of dough as shown are not in such alignment; that is, they are malpositioned on conveyor 3. Furthermore, as already mentioned, the malpositioning of the pieces of dough on conveyor 3 may also consist in an unequal lengthwise spacing, rather than in transverse misalignment.

Conveyor 3 as a whole is pivotal about a shaft 5. Discharge of pieces of dough from the conveyor—that is, transfer of pieces of dough from conveyor 3 to the dough carriers, is effected at the end 4 of the conveyor. The direction of travel of the conveyor 3 is indicated by an arrow. Of course, conveyor 3 may be continued to the left of shaft 5.

The conveyor may be reciprocated up and down through a distance indicated by the showing of the conveyor in its lowermost position in full lines and in its uppermost position in chain-link lines. The distance of movement of the conveyor is approximately equal to the spacing between two transverse rows of dough carriers on conveyor 1. Reciprocation of conveyor 3 is effected by actuating means comprising a cam rod 6 linked to the conveyor. Rod 6 is movable up and down, as indicated by an arrow and mounts a cam follower 9. The cam follower coacts with a cam 10 fixedly seated on a shaft 11 which is driven at uniform rate of speed by suitable driving means (not shown). The cam is designed so that there is a uniform rise in ¾ of a revolution and a uniform fall in the remaining ¼ of a revolution. The cam moves rod 6 from its lowermost position to its uppermost position (shown in phantom at 9' and 10') at a rate of speed such that the time required by the discharge end 4 of conveyor 3 to move from its lowermost position to its uppermost position is substantially equal to the time required for a transverse row of dough carriers to travel through the same distance. Furthermore, the movements of discharge end 4 and the dough carriers are synchronized, so that the respective row of dough carriers will remain substantially juxtaposed to the discharge end 4 as the latter travels toward its upper position. Such synchronized travel is shown in FIG. 1 for dough carriers 2a.

The operation of the device as hereinabove described, is as follows:

If the three pieces of dough T1, T2 and T3 were in correct transverse alignment, all three would be ready for transfer from conveyor 3 to dough carriers 2a, 2a' and 2a" when the same are substantially at their full-line positions. However, only piece T1 is ready for such transfer, and that piece will tumble from conveyor 3 into carrier 2a. The two other carriers, 2a' and 2a" remain empty for the time being. When carrier 2a' has reached the position shown in broken lines, piece T2 is ready for transfer and will tumble into dough carrier 2a'. The third piece T3 in the same transverse row of conveyor 3 is ready for transfer when both the respective dough carrier 2a" and the conveyor 3 have reached the uppermost position. All three pieces of dough are now loaded in the appropriate row of dough carriers. Conveyor 3 returns rapidly to its lowermost position and is thus ready to start a new cycle of loading the next following row of dough carriers.

As is apparent, the period of time available for the transfer of pieces of dough in any transverse row on conveyor 3 to the respective row of carriers on conveyor 1 is the period of time required by the discharge end 4 to travel through the distance from the lower limit position to the upper limit position of conveyor 3. Accordingly, if all three pieces of dough in any transverse row are in correct alignment and also correctly spaced lengthwise from the next following transverse row of pieces of dough, all three pieces of dough will be loaded when the respective dough carriers are in the full-line position. Similarly, all three pieces of dough in any transverse row will simultaneously tumble into the respective dough carriers though not in the lowermost position of conveyor 3 when the pieces of dough are in correct transverse alignment but are misaligned lengthwise. As appears from the previous description, the feeding device according to the invention will compensate for misalignment of pieces of dough in either a transverse or a lengthwise direction within rather wide limits.

While the invention has been described in detail with respect to a certain now preferred example and embodiment of the invention, it will be understood by those skilled in the art, after understanding the invention, that various changes and modifications may be made without departing from the spirit and scope of the invention, and it is intended therefore to cover all such changes and modifications in the appended claims.

I claim:

1. A device for successively feeding, one by one, substantially equally sized units of material to continuously moving carriers, said device comprising a continuously movable conveyor for transporting thereon said units of material spaced apart in lengthwise row arrangement, a plurality of carriers continuously movable, uniformly spaced apart, along a rectilinear path, each carrier being shaped to accommodate one of said units, said conveyor having a discharge end terminating adjacent the path of said carriers for transferring said units one by one from the conveyor to successive carriers, support means supporting said conveyor pivotally at the discharge end thereof through a distance about equal to the distance between each two adjacent carriers and substantially parallel to the path of travel thereof, and actuating means coacting with said conveyor for pivoting the discharge end thereof through said distance from an initial position to an end position at a rate of movement substantially equal to the rate of travel of the carriers along said path.

2. A device according to claim 1, wherein said actuating means return said discharge end of the conveyor to said initial position at a rate of speed accelerated in relation to the rate of movement of the discharge end toward said end position.

3. A device according to claim 1, wherein said actuating means move said discharge end of the conveyor toward said end position in synchronism with the travel of each successive carrier through said distance.

4. A device for successively feeding, one by one, substantially equally sized units of material to continuously moving carriers, said device comprising a continuously movable conveyor for transporting thereon said units of material spaced apart in several lengthwise and transverse parallel rows, a plurality of carriers continuously movable along a rectilinear path, said carriers being uniformly spaced in lengthwise direction, each carrier having a length and width dimensioned to receive and retain in transversely aligned position the units placed on the conveyor in one transverse row and transferred to the carrier, said conveyor having a discharge end terminating adjacent the path of said carriers for transferring the units of material in successive transverse rows on the conveyor, row by row to successive carriers, support means supporting said conveyor pivotally at the discharge end thereof through a distance about equal to the distance between each two adjacent transverse rows of carriers and substantially parallel to the path of travel thereof, and actuating means coacting with said conveyor for pivoting the discharge end thereof through said distance from an initial position to an end position at a rate of movement substantially equal to the rate of travel of the carriers along said path.

5. A device according to claim 4, wherein said actuating means return said discharge end of the conveyor to said initial position at a rate of speed accelerated in relation to the rate of movement of the discharge end toward said end position.

6. A device according to claim 4, wherein said actuating means comprise a cam means including a rotary cam and a cam follower coacting with the cam and linked to the conveyor, said cam having a camming surface causing during each revolution of said cam a rise of the discharge end of the conveyor through said distance from said initial position and a return into said initial position.

7. A device according to claim 6 wherein said camming surface has a shape such that the rise of the discharge end of the conveyor requires three-fourths and the return movement one-fourth of the time required by each one of said carriers to travel through a distance equal to the lengthwise spacing therebetween.

References Cited in the file of this patent

UNITED STATES PATENTS 1,766,142    Olson  ------------------ June 24, 1930